United States Patent [19]
Rosenberg

[11] Patent Number: 5,099,876
[45] Date of Patent: Mar. 31, 1992

[54] QUICK-ACTION SHUT-OFF VALVE

[76] Inventor: Peretz Rosenberg, Moshav Beit Shearim, Israel

[21] Appl. No.: 633,869

[22] Filed: Dec. 26, 1990

[30] Foreign Application Priority Data

Feb. 23, 1990 [IL] Israel .................................. 93504

[51] Int. Cl.⁵ ............................................ F16K 31/363
[52] U.S. Cl. ................................... 137/509; 251/77
[58] Field of Search .................. 137/509, 474; 251/77

[56] References Cited

U.S. PATENT DOCUMENTS

| | | | |
|---|---|---|---|
| 3,143,612 | 8/1964 | Hidde Nijland | 137/474 X |
| 3,236,256 | 2/1966 | Valentine | 137/509 |
| 3,608,581 | 9/1971 | Sweet | 137/509 |
| 4,072,165 | 2/1978 | Bradley | 137/509 X |

FOREIGN PATENT DOCUMENTS 1650351  8/1979  Fed. Rep. of Germany ...... 137/509
524035  10/1976  U.S.S.R. .............................. 137/509

Primary Examiner—Stephen M. Hepperle
Attorney, Agent, or Firm—Benjamin J. Barish

[57] ABSTRACT

A quick-action shut-off value includes a valve member normally urged by the inlet pressure to close a valve seat, a movable carrier member normally urged towards the valve seat by a biassing spring, but moved away from the valve seat by the inlet pressure, and a lost-motion connection between the valve member and carrier member effective, when the carrier member and the valve member are in their initially closed positions with respect to the valve seat and the inlet pressure increases, to permit the inlet pressure initially to move the carrier member away from the valve seat while the valve member is held to the valve seat by the inlet pressure, until the lost-motion connection is taken-up, whereupon the carrier member moves the valve member away from the valve seat to open the valve.

17 Claims, 3 Drawing Sheets

QUICK-ACTION SHUT-OFF VALVE

FIELD AND BACKGROUND OF THE INVENTION

The present invention relates to a shut-off valve, and particularly to shut-off valves which automatically open at a predetermined high inlet pressure, and automatically close at a significantly lower inlet pressure.

Examples of the type of shut-off valves to which the present invention is directed are described in my prior U.S. Pat. Nos. 4,678,004 and 4,889,154. Such valves have many uses, for example in water irrigation systems to shut off the flow of water to irrigation devices such as sprinklers, and also in pulsator systems for supplying water in the form of pulses to water irrigation devices.

OBJECTS AND BRIEF SUMMARY OF THE INVENTION

An object of the present is to provide a shut-off valve of a relatively simple construction, readily manufacturable in volume and at low cost, and effective to automatically close upon the presence of a predetermined high inlet pressure, and to automatically open upon the presence of a predetermined, lower inlet pressure, with both the opening and the closing of the valve being effected by a quick-action.

According to the present invention, there is provided a quick-action shut-off valve, comprising a housing having an inlet and an outlet interconnected by a connecting passageway having a valve seat, and a valve assembly on the inlet side of the valve seat. The inlet, outlet and valve seat all have a common longitudinal axis. The valve assembly comprises a valve member normally urged by the inlet pressure towards the valve seat to close the connecting passageway; a movable carrier member normally urged towards the valve seat by a biassing spring, but moved away from the valve seat by the inlet pressure; and a lost-motion connection between the valve member and the carrier member. The movable carrier member is of cylindrical configuration and has a longitudinal axis coaxial with the common longitudinal axis of the inlet, outlet and valve seat. The lost-motion connection includes a second spring of lighter force than the biassing spring, and normally urging the valve member towards the carrier member. The movable carrier member includes an end wall on the side thereof facing the valve seat, and the lost-motion connection comprises a stem movable through an opening in the end wall and carrying at one end the valve member. The second spring is interposed between the opposite end of the stem and the carrier member to normally urge the valve member towards the carrier member. When the carrier member and the valve member are in their initially closed positions with respect to the valve seat and the inlet pressure increases, the lost-motion connection is effective to permit the inlet pressure initially to move the carrier member away from the valve seat while the valve member is held to the valve seat by the inlet pressure, until the lost-motion connection is taken-up, whereupon the carrier member moves the valve member away from the valve seat to open the valve.

Two embodiments of the invention are described below for purposes of example.

In one described embodiment, the carrier member is coupled to a piston subject to the inlet pressure so as to be moved thereby away from the valve seat a distance corresponding to the inlet pressure. The piston is an annular piston disposed externally of the housing and cooperates with an outer face of the housing to define an expansible chamber therewith.

In the second described embodiment, the carrier member is a piston movable within a cylinder in the housing, and subject to the inlet pressure so as to be moved thereby away from the valve seat a distance corresponding to the inlet pressure.

As will be more apparent from the description below, a valve constructed in accordance with the foregoing features will, when initially closed, automatically open with a quick-action upon the presence of a predetermined high inlet pressure, and will automatically reclose, also with a quick action, upon the presence of a predetermined lower inlet pressure, thereby making such valves especially useful in water irrigation systems, pulsator systems, and the like. In addition, shut-off valves in accordance with the foregoing features may be manufactured in volume and at relatively low cost.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

The Embodiment of FIGS. 1-4

Figure 1:
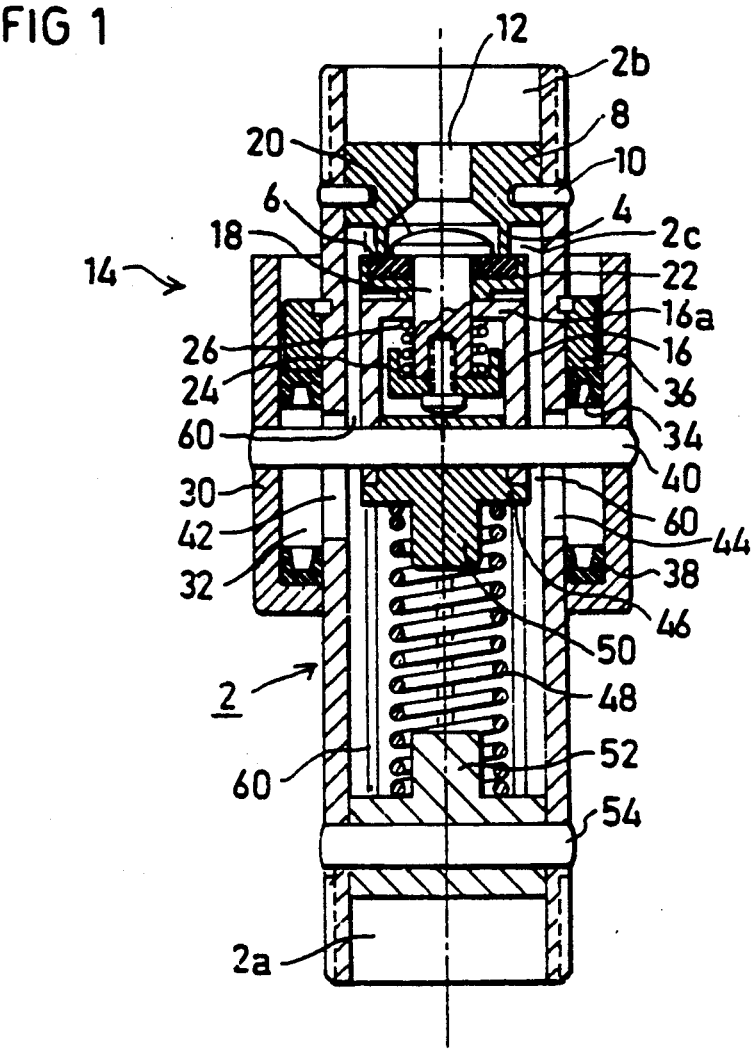
FIG. 1 is a longitudinal sectional view illustrating one form of shut-off valve constructed in accordance with the present invention, the valve being shown in its closed condition.
Figure 2:
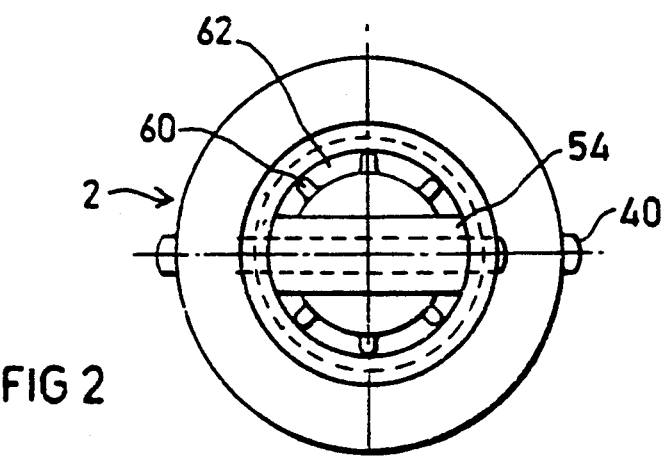
FIG. 2 is a bottom view, i.e., from the inlet end, of the valve of FIG. 1.
Figure 3:
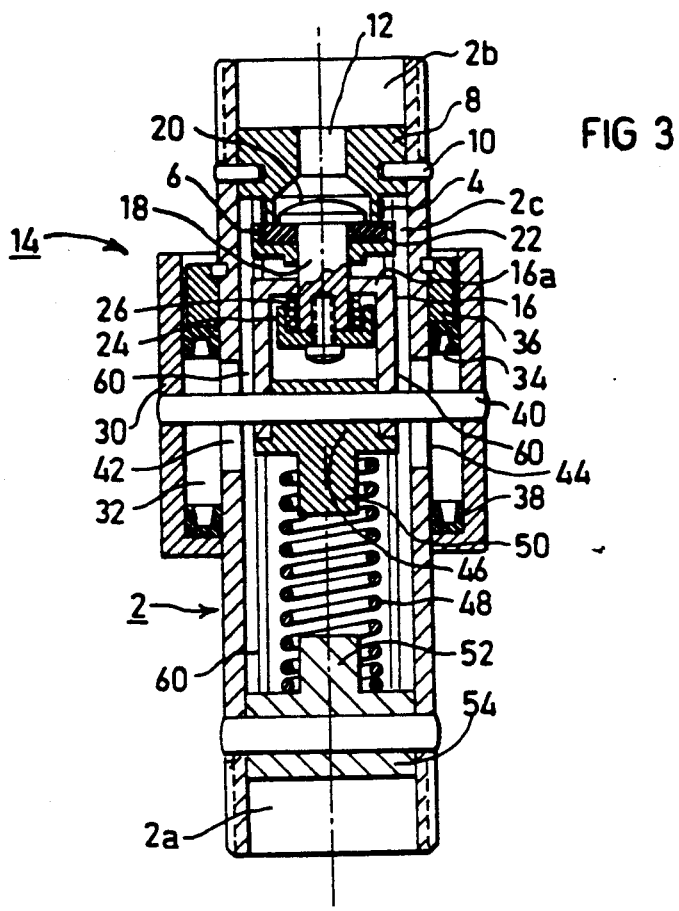
FIG. 3 is a view similar to that of FIG. 1, but showing the condition of the parts when the inlet pressure has increased but just before the valve has opened.
Figure 4:
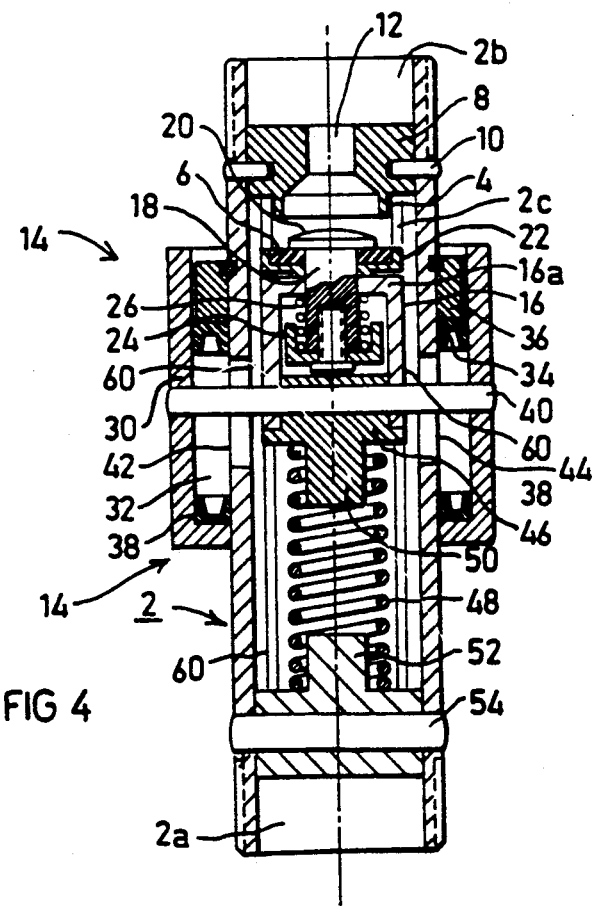
FIG. 4 is a view similar to that of FIGS. 1 and 3 but showing the parts after the valve has opened by the inlet pressure.
Figure 5:
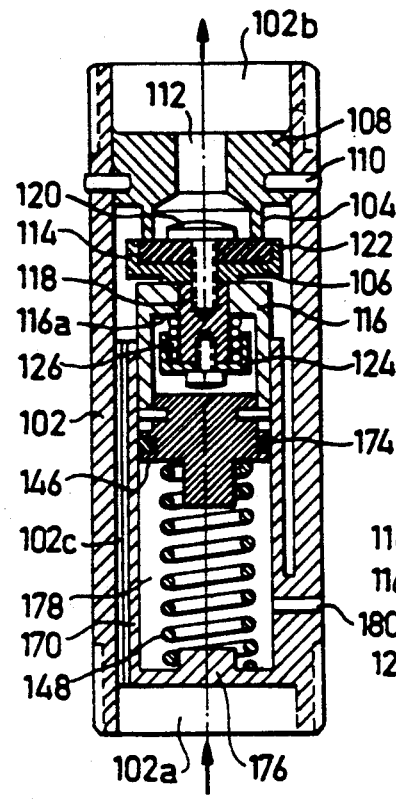
FIGS. 5-8 are views corresponding to FIGS. 1-4 but illustrating a second form of shut-off valve constructed in accordance with the present invention.
Figure 7:
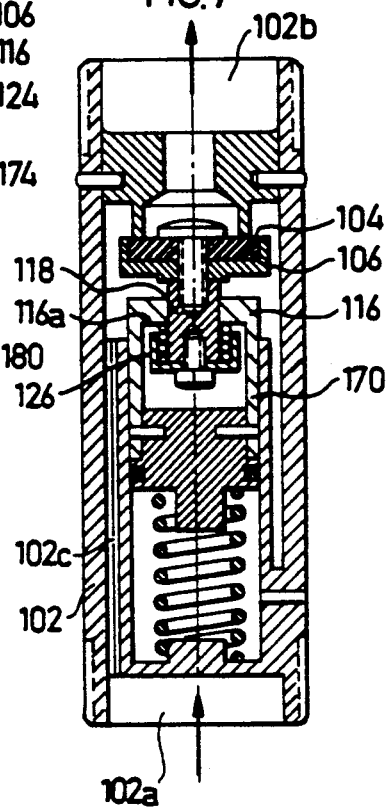
Figure 6:
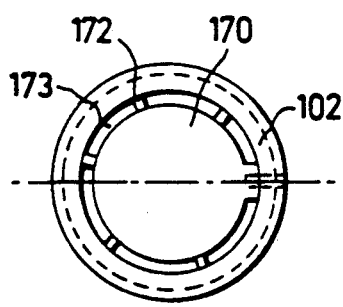

The valve illustrated in FIGS. 1-4 of the drawings comprises a housing 2 of cylindrical configuration, having an inlet 2a at one end, an outlet 2b at the opposite end, and a connecting passageway 2c connecting the inlet to the outlet. Within the connecting passageway is a valve seat 4 cooperable with a valve member 6 for opening and closing passageway 2c. FIGS. 1 and 3 illustrate valve member 6 engaging valve seat 4 to close passageway 2c, and thereby block the flow of fluid (e.g., water) from the inlet 2a through the outlet 2b; whereas FIG. 4 illustrates valve member 6 moved away from valve seat 4, thereby permitting the flow of the fluid through the valve outlet.

Valve seat 4 is in the form of an annular flange integrally formed on one face of a disc 8 fixed by pins 10 to the valve housing 2. Valve seat 4 is coaxial with an opening 12 formed through disc 8 to permit the fluid to flow through the outlet 2b of the housing.

Valve member 6 is part of a valve assembly, generally designated 14, located at the inlet end of the housing. Valve assembly 14 further includes a cylindrical carrier member 16 formed at one end with an end wall 16a through which passes a stem 18. Valve member 6, preferably in the form of a resilient disc, is carried at one end of stem 18, by being fixed between head 20 of stem 18 and a skirt 22 also fixed to the stem.

The opposite end of stem 18 is received within the interior of carrier member 16 and has secured thereto another skirt 24 which serves as a seat for a coil spring 26 interposed between it and the inner face of the carrier end wall 16a. Spring 26 is preferably a relatively light spring and urges valve member 6 towards end wall 16a of the carrier member 16.

Stem 18, skirt 24, and spring 26, thus serve as a lost-motion connection between valve member 6 and carrier member 16, permitting the valve member to move a predetermined distance with respect to the carrier member 16, until the edge of skirt 24 engages the inner face of end wall 16a of the carrier member.

Valve assembly 14 further includes a displaceable member, in the form of an annular piston 30, which is displaceable in response to the pressure of the fluid at the housing inlet 2a. The displaceable piston 30 is disposed externally of the housing 2 and is cooperable with the outer face of the housing to define an expansible chamber 32 subjected to the inlet pressure. One end of expansible chamber 32 is defined by an annular seal 34 fixed by ring 36 to the outer face of housing 2; whereas the other end, namely the movable end, of expansible chamber 32 is defined by another seal 38 carried by the annular piston 30.

Annular piston 30 is connected to carrier member 16 of the valve assembly by means of a pin 40 extending diametrically across the piston and through axial slots 42, 44 formed in housing 2 to permit the displacement of piston 30 in response to the inlet pressure. Pin 40 also passes through an end wall 46 closing the respective end of carrier member 16 such that the displacement of piston 30 in response to the inlet pressure effects a corresponding displacement of carrier member 16. Slots 42, 44 through housing 2 define a passage through the housing establishing communication between the housing inlet 2a and the expansible chamber 32 defined by the annular piston 30.

Carrier member 16, and thereby piston 30, are urged towards the valve seat 4, by a coil spring 48 interposed between a stem 50 integrally formed with end wall 46 of the carrier member 16, and a second stem 52 integrally formed with a pin 54 extending diametrically across and fixed to the inlet end 2a of housing 2. The two stems 50, 52 are of slightly smaller diameter than the inner diameter of coil spring 48, to define seats for receiving the opposite ends of the coil spring.

The inner face of housing 2 is formed with a plurality of axially-extending, circumferentially-spaced ribs 60. These ribs are engageable with the outer face of carrier member 16 to guide its movements in the axial direction. The spacings between the ribs define passageways 62 (FIG. 2) for the fluid to flow to the fixed valve seat 4 cooperable with the movable valve member 6.

The shut-off valve illustrated in FIGS. 1–4 operates as follows:

When there is no pressure at the inlet 2a, spring 48, which is considerably stronger than spring 26 in the lost-motion connection between valve member 6 and the carrier member 16 of the valve assembly 14, urges the carrier member 16 to its uppermost position with respect to valve seat 4. In this condition, as illustrated in FIG. 1, valve member 6 is firmly pressed against valve seat 4, thereby shutting-off the valve. As soon as pressure is applied at the inlet 2a, the inlet pressure aids the action of spring 48 in pressing valve member 6 against the valve seat 4.

As the inlet pressure increases, the inlet pressure applied to chamber 32 via slots 42, 44, initially displaces the annular piston 30 (downwardly) away from valve seat 4, and also moves the carrier member 16 in the same direction by virtue of its pin connection 40. However, the inlet pressure still holds valve member 6 against valve seat 4, despite the initial movement of carrier member 16 because of the lost-motion connection formed by stem 18 between valve member 6 and the carrier member 16. This is the condition illustrated in FIG. 3.

As the inlet pressure increases and annular piston 30 is displaced further away from valve seat 4, the end of skirt 24 engages the inner face of the end wall 16a of carrier member 16. This terminates the lost-motion between the valve member 6 and the carrier member 16, thereby causing the carrier member to move the valve member 6 away from valve seat 4. As soon as the valve member has moved slightly from the valve seat 4, the inlet pressure aids spring 26 in effecting a quick-action opening of the valve member. This is the condition illustrated in FIG. 4. In this condition, the open valve produces a discharge of the fluid (e.g., water) from the inlet 2a to the outlet 2b.

Should the inlet pressure drop only slightly, the annular piston 30 and carrier member 16 will tend to move towards valve seat 4. However, spring 26, together with the inlet pressure, will maintain valve member 6 against the outer face of end wall 16a of carrier member 16; i.e., the valve will still remain open.

When the pressure drops to a larger predetermined value lower than the opening pressure, the suction produced by the flow of water through valve seat 4 will overcome the force of spring 26 and will draw valve member 6 towards valve seat 4, whereupon the inlet pressure will firmly retain the valve member against the valve seat. The described construction thus also produces a quick-action closing of the valve.

As one example, the parts may be designed such that the valve opens at about 3 atmospheres and closes at about 1.5 atmospheres.

THE EMBODIMENT OF FIGS. 5–8

FIGS. 5–8 illustrate a second embodiment of the invention, wherein the function of the external annular piston 30 in the embodiment of FIGS. 1–3 is performed by the carrier member itself, which serves as an internal piston movable within a cylinder in the housing.

More particularly, the valve illustrated in FIGS. 5–8 also includes a cylinder housing 102, having an inlet 102a at one end, an outlet 102b at the opposite end, and a connecting passageway 102c connecting the inlet to the outlet. A valve seat 104, cooperable with a valve member 106, is formed on one face of a disc 108 fixed by pins 110 to the valve housing 102. Valve seat 104 is coaxial with an opening 112 formed through disc 108.

Valve member 106 is part of a valve assembly 114 located at the inlet end of the housing. This assembly further includes a cylindrical member 116 formed at one end with an end wall 116a through which passes a stem 118. Valve member 106 is carried at one end of stem 118 between head 120 and a skirt 122. The opposite end of stem 118 is within the interior of carrier member 116 and has secured thereto another skirt 124 which serves a seat for a coil spring 126 interposed between it and the inner face of the carrier end wall 116a.

The lower end of carrier member 116 is closed by an end wall 146 which also defines a seat for coil spring 148, corresponding to coil spring 48 in FIGS. 1-4 urging the carrier member 116, and also the valve member 106, toward the valve seat 104.

Stem 118, skirt 124 and spring 126 thus serve as a lost-motion connection between valve member 106 and carrier member 116, in the same manner as described above with respect to FIGS. 1-4.

The construction of FIGS. 5-8, however, does not include the external annular piston (30, FIGS. 1-4); instead, the carrier member 116 serves as an internal piston movable within a cylinder 170 fixed within housing 102. Cylinder 170 is spaced from the inner face of housing 102 by a plurality of axially-extending, circumferentially-spaced ribs 172 so as to provide passages 173 from the inlet 102a to the valve seat 104 at the outlet 102b of the housing.

In addition, end wall 146 of the carrier member 116 is provided with a sealing ring 174 engageable with the inner surface of cylinder 170. It will thus be seen that coil spring 148 tends to move carrier member 116 outwardly of cylinder 170, but the force of the spring is opposed by the inlet pressure applied to the carrier member tending to move it inwardly of the cylinder.

Cylinder 170 is closed at its opposite end 176, i.e., the end adjacent to the housing inlet 102a to define a chamber 178 with the spring seat 140. Chamber 178 is vented to the atmosphere by a vent 180.

Figure 8:
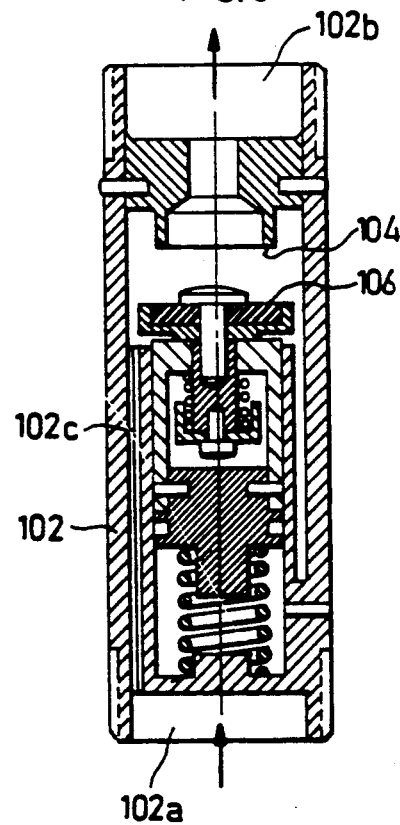

It will be seen that the valve illustrated in FIGS. 5-8 operates in substantially the same manner as described above with respect to FIGS. 1-4. Thus, the valve member 106 is normally urged by the inlet pressure firmly against valve seat 104 (FIG. 5) to normally maintain the valve closed. The inlet pressure is applied to the valve carrier 116 which, acting as a piston within cylinder 170, tends to move away from valve seat 104 a distance corresponding to the inlet pressure. However, the lost-motion connection provided by stem 118 permits the valve member 106 to remain seated against the valve seat 104, keeping the valve closed (FIG. 7) until the carrier member has moved sufficiently to take-up the lost-motion connection. This occurs when the lower face of the carrier member wall 116a engages skirt 126, whereupon valve stem 118 is moved downwardly to move the valve member 106 away from the valve seat 104 (FIG. 8).

The valve of FIGS. 5-8 thus produces a quick-action opening of the valve, and a quick-action reclosing of the valve (upon the drop of the inlet pressure to a predetermined value) in the same manner as described above with respect to FIGS. 1-4.

While the invention has been described with respect to two preferred embodiments, it will be appreciated that many other variations, modifications and other applications of the invention may be made.

What is claimed is:

1. A quick-action shut-off value, comprising:

a housing having an inlet and an outlet interconnected by a connecting passageway having a valve seat; said inlet, outlet and valve seat all having a common longitudinal axis;

and a valve assembly on the inlet side of said valve seat; said valve assembly comprising:

a valve member normally urged by the inlet pressure towards said valve seat to close said connecting passageway;

a movable carrier member normally urged towards said valve seat by a biassing spring, but moved away from said valve seat by the inlet pressure;

and a lost-motion connection between said valve member and said carrier member, effective when the carrier member and the valve member are in their initially closed positions with respect to said valve seat and the inlet pressure increases, to permit the inlet pressure initially to move the carrier member away from the valve seat while the valve member is held to the valve seat by the inlet pressure, until the lost-motion connection is taken-up, whereupon the carrier member moves the valve member away from said valve seat to open the valve;

said movable carrier member being of cylindrical configuration and having a longitudinal axis coaxial with said common longitudinal axis of said inlet, outlet and valve seat;

said lost-motion connection including a second spring of lighter force than said biassing spring, and normally urging said valve member towards said carrier member;

said movable carrier member including an end wall on the side thereof facing said valve seat;

said lost-motion connection comprising a stem movable through an opening in said end wall and carrying at one end said valve member;

said second spring being interposed between the opposite end of the stem and the carrier member to normally urge said valve member towards said carrier member.

2. The valve according to claim 1, wherein said carrier member is coupled to a piston subject to the inlet pressure so as to be moved thereby away from the valve seat a distance corresponding to the inlet pressure.

3. The valve according to claim 2, wherein said piston is an annular piston disposed externally of the housing and cooperates with an outer face of the housing to define an expansible chamber therewith.

4. The valve according to claim 3, wherein the outer face of the housing includes a seal defining a fixed end of the expansible chamber; said displaceable annular piston including another seal defining a movable end of the expansible chamber, and a pin extending through a slot in the housing wall and connected to said carrier member.

5. The valve according to claim 1, wherein said carrier member is of cylindrical configuration and is spaced from an inner face of the housing by a plurality of axially-extending ribs.

6. The valve according to claim 1, wherein said biassing spring is interposed between a spring seat formed in said housing, and another spring seat formed in the movable carrier member.

7. The valve according to claim 6, wherein said biassing spring is a coil spring, and both of said first and second seats include stems facing each other and having diameters slightly less than the inner diameter of the coil spring.

8. The valve according to claim 6, wherein said second seat is fixed to a pin secured to and extending transversely across the inlet end of said housing.

9. The valve according to claim 1, wherein said carrier member is a piston movable within a cylinder in said housing, and subject to the inlet pressure so as to be moved thereby away from the valve seat a distance corresponding to the inlet pressure.

10. The valve according to claim 9, wherein an outer face of said cylinder is spaced from an inner face of the housing by a plurality of axially-extending circumferentially-spaced ribs formed between said cylinder and housing.

11. The valve according to claim 10 wherein said biassing spring is interposed between a spring seat fixed within said cylinder and another spring seat formed in the movable carrier member.

12. The valve according to claim 1, wherein said valve seat is carried by an apertured disc secured across the outlet end of said housing.

13. A quick-action shut-off valve, comprising:
   a housing having an inlet and an outlet interconnected by a connecting passageway having a valve seat;
   and a valve assembly on the inlet side of said valve seat; said valve assembly comprising:
   a valve member normally urged by the inlet pressure towards said valve seat to close said connecting passageway;
   a movable carrier member urged towards said valve seat by a biassing spring;
   an annular piston disposed externally of the housing and cooperating with an outer face of the housing to define an expansible chamber therewith;
   said piston being coupled to said carrier member; said housing including a passage therethrough establishing communication between said inlet and said expansible chamber such as to displace said piston and carrier member in accordance with said inlet pressure;
   and a lost-motion connection between said valve member and said carrier member.

14. The valve according to claim 13, wherein said lost-motion connection includes a second spring of lighter force than said biassing spring, and normally urging said valve member towards said carrier member.

15. The valve according to claim 14, wherein said movable carrier member includes an end wall on the side thereof facing said valve seat, said lost-motion connection comprising a stem movable through an opening in said end wall and carrying at one end said valve member, said second spring being interposed between the opposite end of the stem and the carrier member to normally urge said valve member towards said carrier member.

16. The valve according to claim 13, wherein the outer face of the housing includes a seal defining a fixed end of the expansible chamber; said displaceable annular piston including another seal defining a movable end of the expansible chamber, and a pin extending through a slot in the housing wall and connected to said carrier member.

17. The valve according to claim 13, wherein said biassing spring is interposed between a spring seat formed in said housing, and another spring seat formed in the movable carrier member.

* * * * *